United States Patent Office 3,573,294
Patented Mar. 30, 1971

3,573,294
7 - (ARYLGLYOXAMIDO)CEPHALOSPORANIC ACIDS AND THEIR SALTS AND α-CARBONYL DERIVATIVES
Alan Gibson Long, Greenford, Edward McKenzie Wilson, Hayes, and William Graham, Pinner, England, assignors to Glaxo Laboratories Limited, Greenford, England
No Drawing. Filed Mar. 14, 1968, Ser. No. 712,962
Int. Cl. C07d 99/24
U.S. Cl. 260—243
11 Claims

ABSTRACT OF THE DISCLOSURE

The invention relates to antibiotics which are compounds of the formula

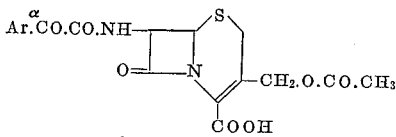

in which Ar represents an aromatic group having an atomic weight sum of at least 78 and their pharmaceutically acceptable salts and α-carbonyl derivatives.

---

This invention is concerned with improvements in or relating to derivatives of cephalosporin C. The antibiotic cephalosporin C is a derivative of the bicyclic compound cepham, which has the structure

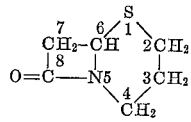

(see J.A.C.S., 84 (1962), page 3400) and is numbered as indicated.

Most antibiotics prepared up to the present, which have the 3,4-dehydrocepham structure, are administered parenterally, the compounds by the oral route being either only feebly active, or totally inactive. This invention concerns compounds which are active as antibiotics. Some of them are absorbed by the oral route in significant amounts as evidenced by animal tests. The compounds are also useful intermediates in the preparation of other antibiotics.

According to the invention, therefore, we provide compounds of the formula

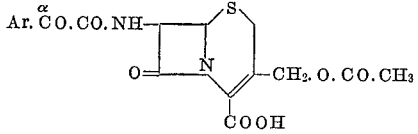

in which Ar represents an aromatic group having an atomic weight sum of at least 78, and their pharmaceutically acceptable salts. The invention also includes the α-carbonyl derivatives of all such compounds.

Whereas the group Ar in compounds of Formula I can represent a heterocyclic aromatic group, e.g., a pyridyl or thienyl group, it preferably represents a substituted phenyl group. The substituents can be one or more fused benzene rings as in naphthyl and phenanthryl groups, e.g. Ar can represent a 1-naphthyl or 2-phenanthryl group. However, Ar can also represent a group of the formula

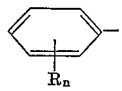

where R represents, for example, a substituted or unsubstituted amino group, a halogen atom, a lower alkyl, lower alkoxy, or lower alkoxycarbonyl group, or a nitro or cyano group, and $n$ is an integer from 1 to 4. When $n$ is greater than 1, the various groups R can be the same or different. When R represents a substituted amino group, it can be for example a monoacylamino group, e.g., a lower alkanoylamino group (e.g., formamido or acetamido), or a mono- or di- (lower alkyl) amino group, e.g., a dimethylamino group. By the term "lower" as applied to alkyl, alkanoyl and alkoxy groups we mean such groups having 1 to 6, particularly 1 to 4, carbon atoms, e.g., methyl, methoxy, formyl and acetyl groups.

The group Ar is most preferably a mono-, di-, or tri-substituted phenyl group, the substituents being one or more halogen atoms, (fluorine, chlorine, bromine, or iodine atoms), methoxy groups, methyl groups, or amino groups, or a fused benzene ring.

Salts which may be used include (a) inorganic base salts such as alkali metal, e.g. sodium and potassium, ammonium, alkaline earth metal e.g. calcium, salts and organic base salts e.g. procaine and dibenzylethylene diamine salts where there is a free 4-COOH group and (b) where Ar contains a basic group, and the compound exists as a Zwitterion, salts formed in (a) above or acid addition salts, e.g., with hydrochloric, sulphuric, nitric, phosphoric and citric acids. The salts may likewise be in the form of resinates, formed, e.g., with a polystyrene resin containing amino, quaternary amino or sulphonic acid groups, or a resin containing carboxyl groups, e.g., a polyacrylic acid resin. The resin may if desired be cross-linked, e.g. it may be a copolymer of styrene and divinylbenzene containing the appropriate groups.

The salts may be obtained from the free acid by reaction with an appropriate base.

When an α-carbonyl derivative of a compound of the Formula I is prepared, that α-carbonyl derivative is preferably the oxime, semicarbazone, thiosemicarbazone, iso-nicotinoylhydrazone, hydrazone or methoxime thereof.

According to a further feature of the invention, we provide a process for the preparation of a compound of the Formula I which comprises acylating 7–ACA (7β-aminocephalosporanic acid) or an acid addition salt thereof with an aromatic glyoxylic acid Ar.CO.CO₂H or with an amide-forming derivative thereof. The acylation can be effected either with the acid itself, in the presence of an organic condensing agent, or with a reactive derivative of the acid.

Where the acid itself is used, the reaction is preferably carried out in aqueous or aqueous-organic solution in the presence of carbonyldi-imidazole or a carbodi-imide, e.g., N,N-diethyl-, N,N-dipropyl-, or N,N-di-isopropyl-carbodi-imide, or preferably N,N-dicyclohexylcarbodi-imide.

Preferred reactive derivatives of the aromatic glyoxylic acid include activated esters, reactive azides, acid halides e.g. the acid chloride (where these are readily preparable), or anhydrides, e.g. mixed anhydrides. It is especially preferred to use as reactive derivative a mixed acid anhydride of the glyoxylic acid, e.g. the anhydride formed between the latter acid and butyric, valeric, isovaleric, trifluoroacetic, or pivalic acid, ethyl hydrogen carbonate or isobutyl hydrogen carbonate. The mixed acid anhydride can be prepared for example from the corresponding acid halide, preferably the chloride.

Preferred reactive esters which couple directly with the 7β-amino group of 7–ACA include esters of aromatic glyoxylic acids with p-nitrophenol, p-nitrothiophenol, or formaldehyde cyanhydrin.

The acylation of 7–ACA with a reactive derivative at the aromatic glyoxylic acid is conveniently effected in the presence of an organic reaction medium, e.g., chloroform or methylene chloride, and a base, for example a tertiary organic base, e.g. pyridine or lower alkyl pyridines, or a triloweralkylamine. The lower alkyl groups each preferably have 1 to 5 carbon atoms, and the preferred triloweralkylamine is triethylamine. The reaction is preferably effected at −5 to +50° C.

In place of 7–ACA one can use a salt of 7–ACA and effect the acylation as described in British patent application No. 22154/64 (Belgian Pat. No. 664,645).

The compound of the Formula I can be reacted under standard conditions with a ketone reagent, e.g. hydroxylamine, methoxyammonium halide, hydrazine, semicarbazide, thiosemicarbazide, or isoniazide, to form the corresponding ketone derivative, e.g., oxime, methoxime hydrazone, semicarbazone, thiosemicarbazone, or isonicotinoylhydrazone.

Where the group Ar in the compound of Formula I contains an acylamino substituent, that acyl group can if desired be removed by hydrolysis, e.g., with concentrated hydrochloric acid at room temperature, to provide the corresponding amino compound.

The compounds according to the invention may be formulated for administration in any convenient way, by analogy with other antibiotics, e.g., penicillin or neomycin, and the invention therefore includes within its scope a pharmaceutical composition comprising at least one compound of the Formula I hereinbefore defined or α-carbonyl derivative or pharmaceutically acceptable salt thereof adapted for use in human or veterinary medicine. Such compositions may be presented for use in conventional manner with the aid of any necessary pharmaceutical carriers or excipients.

The invention therefore provides pharmaceutical compositions comprising, as active ingredient, at least one compound of the Formula I hereinbefore defined or α-carbonyl derivative or salt thereof in association with a pharmaceutical carrier or excipient. The compositions are preferably presented in a form suitable for absorption by the gastrointestinal tract. Tablets and capsules for oral administration may be in unit dose presentation form, and may contain conventional excipients such as binding agents, for example, syrup, acacia, gelatin, sorbitol, tragacanth, or polyvinylpyrrolidone; fillers, for example lactose, sugar, maize-starch, calcium phosphate, sorbitol or glycine; lubricants, for example, magnesium stearate, talc, polyethylene glycol, silica; disintegrants, for example, potato starch or acceptable wetting agents such as sodium lauryl sulphate. The tablets may be coated according to methods well known in the art. Oral liquid preparations may be in the form of aqueous or oily suspensions, solutions, emulsions, syrups, elixirs, etc. or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin, hydroxyethylcellulose, carboxymethyl cellulose, aluminium stearate gel or hydrogenated edible fats; emulsifying agents, for example, lecithin, sorbitan mono-oleate or acacia; non-aqueous vehicles which may include edible oils, for example, almond oil, fractionated coconut oil, oily esters, propylene glycol, or ethyl alcohol; preservatives, for example, methyl or propyl p-hydroxybenzoates or sorbic acid. Suppositories will contain conventional suppository bases, e.g. cocoa butter or other glyceride.

Compositions for injection may be presented in unit dose form in ampoules, or in multidose containers with an added preservative. The compositions may take such forms as suspensions, solutions, emulsions in oily or aqueous vehicles, and may contain formulatory agents such as suspending, stabilising and/or dispersing agents. Alternatively the active ingredient may be in powder form for reconstitution with a suitable vehicle e.g. sterile, pyrogen-free water before use.

The compositions may also be prepared in suitable forms for absorption through the mucous membranes of the nose and throat or bronchial tissues and may conveniently take the form of powder or liquid sprays or inhalants, lozenges, throat paints etc. For medication of the eyes or ears, the preparations may be presented as individual capsules, in liquid or semi-solid form, or may be used as drops etc. Topical applications may be formulated in hydrophobic or hydrophilic bases as ointments, creams, lotions, paints, powders etc.

For veterinary medicine the composition, may, for example, be formulated as an intramammary preparation in either long acting or quick-release bases.

The compositions may contain from 0.1% upwards, preferably from 10–60% of the active material, depending on the method of administration. Where the compositions comprise dosage units, each unit will preferably contain 50–500 mg. of the active ingredient. The dosage as employed for adult human treatment will preferably range from 100–3000 mg. for instance 1500 mg. per day, depending on the route and frequency of administration.

The compounds according to the invention may be administered in combination with other therapeutic agents such as antibiotics, for example other cephalosporins, the penicillins or tetracyclines.

For the better understanding of the invention, the following examples are given by way of illustration only:

EXAMPLE 1

Sodium 7-(p-dimethylaminophenylglyoxamido) cephalosporanate 7-aminocephalosporanic acid (2.72 g., 0.01 mole) in dry acetonitrile (17.5 ml.) containing triethylamine (3 ml.) was stirred at 5° and treated with an ethereal solution of p-dimethylaminophenylglyoxalyl chloride (ca. 4 g.) prepared as described by Staudinger (Ber., 1909, 42, 3489). The mixture was stirred for 30 mins. at room temperature. The solvent was distilled off under reduced pressure and the residue partitioned between ethyl acetate and water at pH 3. Precipitated solid was filtered off and the two layers were separated. The aqueous layer was extracted with ethyl acetate (2× 50 ml.) and the organic layers were backwashed with water. The dried (magnesium sulphate) ethyl acetate solution was treated with 10% w./v. solution of sodium 2-ethyl-hexanoate in ethyl acetate. The precipitate was allowed to coagulate for 2 hr. at 0°, filtered off, washed with ethyl acetate and dried in vacuo to give sodium 7-(p-dimethylaminophenyl-glyoxamido)-cephalosporanate (0.5 g.) as a yellow solid. $[\alpha]_D^{20}$ +114° (c., 1.0 water); $\lambda_{max.}$ 255, 375 nm.

($E_{1\,cm.}^{1\%}$ 314, 500 respectively); $R_F$ 0.32 (ethyl acetate/n-butanol/pH 5 buffer system).

EXAMPLE 2

7-(5′-chloro-2′-methoxy-4′-methylphenylglyoxamido)-cephalosporanic acid (i) 5-chloro-2-methoxy - 4 - methylphenylglyoxylic acid.—2-chloro-5-methoxy toluene (10.1 g.) was dissolved in carbon disulphide (80 ml.). Ethyl oxalyl chloride (7.1 ml.) was added and the mixture was stirred at 0° during the slow addition (ca. 20 mins.) of anhydrous aluminum chloride (13 g.). The mixture was then allowed to warm to room temperature. After 16 hrs., the carbon disulphide was removed, as far as possible, by decantation and the solid complex was decomposed with ice/hydrochloric acid. The product was extracted into ether, the extract was evaporated in vacuo and the ethyl ester so obtained was hydrolysed with caustic soda solution (8%, 120 ml.) on a steam bath for 30 mins. The mixture was cooled and extracted with ether. The aqueous layer was acidified and again extracted. The ether extract on evaporation gave a semi-solid gum which crystallised on trituration with hot benzene to yield the substituted phenyl-glyoxylic acid (6.6 g., in two crops) M.P. 174–179°; [$\lambda_{max}$. 263 nm.

($E_{1\ cm.}^{1\%}$ 400); $R_F$ 0.27 (ethyl acetate/n-butanol/pH 5 buffer)]. Found (percent): C, 52.3; H, 4.0; Cl, 15.65.

$C_{10}H_9O_4Cl$ requires (percent): C, 52.5; H, 3.97; Cl, 15.5.

(ii) Coupling of 5-chloro-2-methoxy-4-methylphenylglyoxylic acid with 7-aminocephalosporanic acid.—5-chloro-2-methoxy-4-methylphenylglyoxylic acid (2.29 g., 0.01 mole) in a mixture of diethyl ether (35 ml.) and methylene chloride (25 ml.) containing triethylamine (1.4 ml.) was treated at 0° for 30 min. with pivaloyl chloride (1.2 ml.). The precipitated triethylamine hydrochloride was removed by filtration and the filtrate added over 5 mins. to a cold (0°) solution of 7-aminocephalosporanic acid (2.72 g., 0.01 mole) in methylene chloride (50 ml.) containing triethylamine (3.5 ml.). The solution was kept at 0° for 1 hr. The solvents were removed by distillation under reduced pressure and the residual gum was partitioned at pH 3–4 between ethyl acetate and water. Any precipitate was removed by filtration and the layers were separated. The aqueous layer was extracted with ethyl acetate and the extracts were bulked with the organic layer. The resulting solution was washed with water, dried (magnesium sulphate), and concentrated by distillation under reduced pressure. At low bulk a solid was precipitated, filtered off and washed with ethyl acetate, and dried in vacuo to give 7-(5'-chloro-2'-methoxy-4'-methylphenylglyoxamido) cephalosporanic acid (0.90 g., 18.7% theory); $[\alpha]_D^{20}+101.2$ (c. 1.0, pH 7 buffer) $R_F$ 0.38 (ethyl acetate/n-butanol/pH 5 buffer system); $\lambda_{max}$. 265, 227 nm.

($E_{1\ cm.}^{1\%}$ 358, 377 respectively).

$C_2H_{19}O_8N_2SCl$ requires (percent): C, 49.8; H, 3.96; N, 5.8; Cl, 7.35. Found (percent): C, 50.0; H, 4.0; N, 5.8; Cl, 6.8.

A second crop was isolated as the sodium salt (1.35 g., 26.7% theory); $[\alpha]_D^{20}+81.2$ (c. 1.0, water) by the addition of a 10% w./v. solution of sodium 2-ethyl-hexanoate in acetone to an acetone solution of the gum obtained by evaporation of the filtrate.

EXAMPLES 3–10

The following substituted phenylglyoxylic acids (Table I) were made by Friedel-Crafts reaction in a manner similar to that described in Example 2(i). Where the acid has been previously described the reference is given.

ample 2(ii). If the product failed to crystallise as the free acid it was isolated as its sodium salt as described for the second crop in the above example. The results are given in Table III.

EXAMPLE 11

Sodium 7-(m-iodophenylglyoxamido)cephalosporante (i) m-Iodophenylglyoxylic acid.—Acetophenone was nitrated with a sulphuric acid/nitric acid mixture as described in Organic Syntheses Collective Volume 2, p. 434. The m-nitroacetophenone thus obtained was reduced by means of iron powder/acetic acid, diazotised and treated with potassium iodide to give m-iodoacetophenone. m-Iodoacetophenone (26 g.) was suspended in water (250 ml.) and the well stirred suspension was cooled in an ice/water bath to a temperature of 12–16°. Potassium permanganate (45.0 g.) and potassium hydroxide (17.0 g.) were dissolved in hot water (280 ml.). This solution, maintained at 70°, was added to the suspension, maintained at 12–16° over 20 mins. and the mixture stirred for a further 40 mins. Industrial methylated spirits (15 ml.) were added, and the mixture was stirred for 5 mins. and filtered. The filtrate was acidified to pH 3.5 with hydrochloric acid and filtered, and the filtrate extracted with methylene chloride. The aqueous layer was then further acidified to pH 0.8 with hydrochloric acid and extracted with methylene chloride. The methylene chloride solution was dried over magnesium sulphate, evaporated to dryness and the residual solid recrystallised from carbon tetrachloride to give m-iodophenylglyoxylic acid (7.00 g.) as pale yellow plates M.P. 75–77°; $\lambda_{max}$. 229, 254 nm.

($E_{1\ cm.}^{1\%}$ 612, 339 respectively).

$C_8H_5IO_3 \cdot H_2O$ requires (percent): C, 32.7; H, 2.4; I, 43.2. Found (percent): C, 33.2; H, 2.2; I, 43.2.

(ii) Coupling of m-iodophenylglyoxylic acid with 7-aminocephalosporanic acid.—Preparation of a mixed anhydride from m-iodophenylglyoxylic acid and pivaloyl chloride and coupling of this with 7-aminocephalosporanic acid were carried out according to the procedure described in Example 2(ii). The product was isolated as the sodium salt and the result is given in Table III.

EXAMPLES 12–19

The following substituted phenylglyoxylic acids (Table II) were made by alkaline permanganate oxidation of the corresponding acetophenones as described in Example 11(i).

The acids were coupled with 7-aminocephalosporanic

TABLE I.—SUBSTITUTED PHENYLGLYOXYLIC ACIDS

| Example No. | Substituents | M.P., °C. Obs. | M.P., °C. Lit. | UV absorption $\lambda_{max.}$, nm. | $E_{1\ cm}^{1\%}$ | Microanalysis Found C | H | Cl | Formula | Requires C | H | Cl |
|---|---|---|---|---|---|---|---|---|---|---|---|---|
| 3 | 5-chloro-2-methoxy | 136–40 | | 255 | 423 | 50.5 | 3.3 | 16.5 | $C_9H_7O_4Cl$ | 50.6 | 3.3 | 16.6 |
| 4 | 3-chloro-6-methoxy-2,4-dimethyl | 148–9 | | 268 | 170 | 54.2 | 4.45 | 14.4 | $C_{11}H_{11}O_4Cl$ | 54.3 | 4.5 | 14.6 |
| 5 | p-Methoxy | 93 | [1]93 | | | | | | | | | |
| 6 | p-Chloro | 94 | [2]94–5 | | | | | | | | | |
| 7 | p-Bromo | 104–6 | [2]107–8 | | | | | | | | | |
| 8 | 2-methoxy-5-methyl | 117–9 | [1]116–7 | | | | | | | | | |
| 9 | 2,5-dimethoxy | 104–7 | [3]75–6 | | | 56.6 | 5.1 | | $C_{10}H_{10}O_5$ | [5]57.1 | [5]4.8 | |
| 10 | α-Naphthylglyoxylic acid | 111–3 | [4]112–3 | | | | | | | | | |

[1] Sprenger, Ruoff, Frazer, J.A.C.S., 1950, 72, 2874.
[2] Belg. Patent 628,563.
[3] Kaufman, Grombach, Ann., 1906, 344, 68.
[4] Blicke, Feldkamp, J.A.C.S., 1944, 66, 1087.
[5] Calculated.

The above acids were coupled with 7-aminocephalosporanic acid according to the procedure described in Example 2(ii). The results are tabulated in Table III.

acid by the mixed anhydride technique as described in Example 2(ii). The results are tabulated in Table III.

TABLE II.—SUBSTITUTED PHENYLGLYOXYLIC ACIDS

| Example No. | Substituents | M.P., °C. Obs. | M.P., °C. Lit. | UV absorption $\lambda_{max.,}$ nm. | UV absorption $E_{1\,cm.}^{1\%}$ | Microanalysis Found C | Microanalysis Found H | Microanalysis Found Cl | Formula | Microanalysis Calculated C | Microanalysis Calculated H | Microanalysis Calculated Cl |
|---|---|---|---|---|---|---|---|---|---|---|---|---|
| 12 | 2,5-dichloro | 94–5 | | 224; 251 | 500; 218 | 43.9 | 2.1 | 32.7 | $C_8H_4Cl_2O_3$ | 43.8 | 1.83 | 32.4 |
| 13 | o-Methoxy | 102–3 | (²) | 257 | 533 | 60.1 | 4.35 | | $C_9H_8O_4$ | 60.0 | 4.43 | |
| 14 | m-Chloro | 65–6 | ³63–4 | 251 | 600 | | | | | | | |
| 15 | m-Bromo | 61–2 | ³53–5 | 253 | 440 | | | | | | | |
| 16 | p-Methyl | 99–100 | ⁴98–9 | 263 | 956 | | | | | | | |
| 17 | p-Fluoro | 98 | ⁵98–100 | 255 | 630 | | | | | | | |
| 18 | m-Methoxy | 69–70 | ⁶69–70 | 257 | 471 | | | | | | | |
| 19 | 2-phenanthrylglyoxylic acid | 142–5 | ⁷140–5 | 268 | 915 | | | | | | | |

¹ In pH 7 buffer.
² References in the literature but without constants.
³ Made by a different method U.S.P. 3,009,915.
⁴ Made by a different method. Julia and Baillarge, Bull. Soc. Chim. France, 1959, 850.
⁵ Made by a differe t method Belgian Pat. 628,563.
⁶ Sprenger, Ruoff and Frazer, J.A.C.S., 1950, 72, 2876.
⁷ Cymerman-Craig, Loder and Moore, Australian J. Chem., 1956, 9, 222.

EXAMPLE 20

Sodium 7 - (4'-chloro-3'-nitrophenylglyoxamido)cephalosporanate (i) 4 - chloro-3-nitrophenylglyoxylic acid.—4-chloro-3-nitrobenzaldehyde (35 g.) in ethyl acetate (130 ml.) was stirred and cooled to −10° and a 2 M solution of sodium metabisulphite (187.5 ml.) added over 10 mins. To the thick suspension was added over 10 mins. a solution of sodium cyanide (37 g.) in water (120 ml.) and the temperature was not allowed to exceed 5°. Water (90 ml.) and ether (150 ml.) were added and the mixture was stirred for 70 min. and allowed to reach room temperature. The layers were separated and the aqueous layer was extracted with ether. The organic layer and the extracts were dried over magnesium sulphate and evaporated to low bulk. The resulting oil was treated with concentrated hydrochloric acid (115 ml.) at 100° for 1½ hrs. and then cooled to 5°, and the pH adjusted to 8 with sodium hydroxide solution. The solution was extracted with ether, and the aqueous layer was acidified further to pH 1 and re-extracted with ethyl acetate. The dried ethyl acetate solution was evaporated to dryness under reduced pressure to give crude 4-chloro-3-nitromandelic acid (M.P. 86–88°).

The crude acid was refluxed in methanol (200 ml.) containing concentrated sulphuric acid (15 ml.) for 4 hrs. After concentration under reduced pressure to half bulk, water (500 ml.) was introduced and the pH brought to 8 by the addition of solid sodium bicarbonate. The product was extracted into ether and the organic solution washed with 2% saline and dried over magnesium sulphate. Evaporation of the dry solution and trituration of the resulting mass with petroleum ether (200 ml., B.P. 40–60°) gave the methyl ester of 4-chloro-3-nitromandelic acid (34 g.).

The above methyl ester in benzene (240 ml.) containing some water (1 ml.) was refluxed for 5 hrs. with lead tetra-acetate (120 g.). The suspension was diluted with water (300 ml.) and ethyl acetate (150 ml.) and filtered through a kieselguhr bed. The filtrate was separated, and the organic layer was washed with water (2× 250 ml.) and stirred for 10 min. at room temperature with 2 N sodium hydroxide solution (150 ml.). The layers were separated and the aqueous layer, combined with an aqueous backwash of the organic layer, was clarified by filtration. The clear solution was extracted with ethyl acetate first at pH 3.5 and then at pH 0:5. The latter extract was washed with saline, dried over magnesium sulphate and evaporated under reduced pressure to near dryness. The residue was crystallized from benzene to give 4-chloro-3-nitrophenylglyoxylic acid (20.6 g.) in two crops, M.P. 101–103°, $\lambda_{max.}$ 241 nm.

($E_{1\,cm.}^{1\%}$ 762).

$C_8H_4ClNO_5 \cdot ½H_2O$ requires (percent): C, 40.3; H, 2.1; Cl, 14.9; N, 5.9. Found (percent): C, 40.9; H, 2.0; Cl, 15.25; N, 5.9.

(ii) Coupling of 4-chloro-3-nitrophenylglyoxylic acid with 7-aminocephalosporanic acid. — The mixed anhydride, prepared from 4-chloro-3-nitrophenylglyoxylic acid and pivaloyl chloride, was reacted with 7-aminocephalosporanic acid as described in Example 2(ii). The result is given in Table III.

EXAMPLES 21 AND 22

(i) 2,3-dichloro- and p-nitro-phenylglyoxylic acids were made by the method described in Example 20(i) with the following results:

| Substituent | M.P., °C. Obs. | M.P., °C. Lit. | UV absorption $\lambda_{max.}$ nm. | UV absorption $E_{1\,cm.}^{1\%}$ |
|---|---|---|---|---|
| 2,4-dichloro | 62–5 | ¹76 | | |
| p-Nitro | ²110–2 | ³150 | 269 | 817 |

¹By a different procedure; Julia, Baillarge, Bull. Soc. Chim., 1959, 850.
²Found (percent): C, 49.2; H, 2.85; N, 6.85. Calcd. for $C_8H_5NO_5$ (percent): C, 49.2; H, 2.6; N, 7.16.
³By a different procedure; Baker, J., 1937, 2416.

(ii) The acids were coupled with 7-aminocephalosporanic acid substantially by the method described in Example 2(ii) and the results are shown in Table III.

EXAMPLE 23

Sodium 7 - (o-bromophenylglyoxamido)cephalosporanate (i) o - Bromophenylglyoxylic acid.—Isatin (14.7 g.) was diazotised by the method of Seefelder and Armburst (German Pat. 1,212,098).

A mixture of copper sulphate (6.3 g.), copper (2 g.), sodium bromide (15.4 g.), concentrated sulphuric acid (1.63 ml.) and water (100 ml.) was refluxed for 3 hrs. The solid diazonium salt was added to the boiling mixture and the whole was then refluxed for 2 hrs. The mixture was cooled and extracted with ether. The ethereal extract was evaporated in vacuo to an oil which was partitioned between ethyl acetate and water at pH 4.5. The aqueous layer was acidified to pH 1 with concentrated hydrochloric acid and extracted with ethyl acetate. The dried extract was evaporated under reduced pressure and the residue was recrystallised from benzene to give o-bromophenylglyoxylic acid (4.12 g., in two crops) M.P. 104–7° (lit. 93–103°; Rusanow, Ber., 25, 3298 (1892)).

Calcd. for $C_8H_5BrO_3$ (percent): Br, 34.9. Found (percent): Br, 34.6.

(ii) The above acid was coupled with 7-aminocephalosporanic acid substantially as described in Example 2(ii) and the result is given in Table III.

EXAMPLE 24

Sodium 7-o-chlorophenylglyoxamido)cephalosporanate o-Chlorophenylglyoxylic acid (M.P. 114–7°; $\lambda_{max.}$ 253 nm.

$E_{1\,cm.}^{1\%}$

250; reported as being prepared previously in Belgian Pat. 628,563 but no constants are given) was made by a similar technique to that described in Example 23 for the o-bromo derivative and then coupled with 7-aminoceph-

EXAMPLE 25

Sodium 7-(2,4-dimethoxyphenylglyoxamido)cephalosporanate 2,4-dimethoxyphenylglyoxylic acid was prepared from resorcinol dimethylether (12 g.) and ethyl chloroformate by a modified Hoesch synthesis as described in the literature (Hargreaves, McGookin and Robertson, J. Appl. Chem., 8, 273–85, 1958) except for the incorporation of a saponification (8% sodium hydroxide) of the ester to give the free acid. The product (5.5 g.) twice recrystallised from benzene had M.P. 106–108° (lit. 106–108°).

The acid was coupled with 7-aminocephalosporanic acid substantially as described earlier in Example 2(ii). The result is given in Table III.

EXAMPLE 26

Sodium 7-(o-acetamidophenylglyoxamido)cephalosporanate o-Acetamidophenylglyoxylic acid (M.P. 164–5°), prepared from isatin as described by Suida (Ber., 1878, 11, 586; M.P. 160°), was coupled with 7-aminocephalosporanic acid substantially according to the procedure described in Example 2(ii). The result is given in Table III.

EXAMPLE 27

Sodium 7-(p-formamidophenylglyoxamido)cephalosporanate (i) p-Aminophenylglyoxylic acid.—p - Nitrophenylglyoxylic acid [3 g., Example 22(i)] in water (30 ml.) was stirred and heated on a steam bath. Ammonia (22 ml., S.G. 0.88) was added followed by ferrous sulphate (28 g.) in water (60 ml.) and the mixture kept at 95° for 10 min. The solids were removed by hot filtration and the bed washed with hot water. The filtrate and washings were combined and the pH of the solution was adjusted to 3 with concentrated hydrochloric acid. The solution was extracted with ethyl acetate and the aqueous layer further acidified to pH 1. After storing at 0° for 30 min. the precipitate was collected by filtration, washed with water and dried in a vacuum desiccator to give p-aminophenylglyoxylic acid (1.64 g., 65% of theory), $\lambda_{max.}$ 323 nm.

($E_{1\,cm.}^{1\%}$ 1005)

Calcd. for $C_8H_7NO_3$ (percent): C, 58.1; H, 4.2. Found (percent): C, 57.7; H, 4.2.

(ii) p - Formamidophenylglyoxylic acid.—p-Aminophenylglyoxylic acid (1.58 g.) was suspended in dry formic acid (7 ml.) at room temperature. A mixture of dry formic acid (5 ml.) and acetic anhydride (3 ml.) was added as a single charge. The mixture was kept at 0° for 4 hrs. The solid was filtered off, washed with ether (3× 10 ml.) and dried in vacuo for 15 hrs. at room temperature to give p-formamidophenylglyoxylic acid (1.65 g.) as a buff solid, M.P. 196° (d); $\lambda_{max.}$ 294 nm.

($E_{1\,cm.}^{1\%}$ 1103)

$C_9H_7NO_4$ requires (percent): C, 55.9; H, 3.65; N, 7.25. Found (percent): C, 55.7; H, 3.9; N, 7.0.

(iii) The above p-formamidophenylglyoxylic acid was coupled with 7-aminocephalosporanic acid substantially according to the method described in Example 2(ii) and the result is given in Table III.

EXAMPLE 28

Sodium 7-(4'-chloro-3'-formamidophenylglyoxamido)cephalosporanate 3-amino-4-chlorophenylglyoxylic acid was prepared from the corresponding nitro compound as described in Example 27(i). ($\lambda_{max.}$ 236, 268 nm.

$E_{1\,cm.}^{1\%}$ 1000, 480 respectively).

$C_8H_6ClNO_3$ requires (percent): Cl, 17.8; N, 7.1. Found (percent): Cl, 17.8; N, 6.6.

The amine was formylated as described in Example 27(ii) but with the difference that in this instance the free base was soluble in formic acid and the required 4-chloro-3-formamido-phenylglyoxylic acid crystallised out during the refrigeration period (M.P. 185(d); $\lambda_{max.}$ 240 nm.

$E_{1\,cm.}^{1\%}$ 765)

$C_9H_6ClNO_4$ requires (percent): Cl, 15.6. Found (percent): Cl, 15.4.

The above acid was coupled with 7-aminocephalosporanic acid substantially as described in Example 2(ii) and the result is given in Table III.

EXAMPLE 29

7-(p-aminophenylglyoxamido)cephalosporanic acid

Crude 7 - (p - formamidophenylglyoxamido)cephalosporanic acid (900 mg., Example 27) in methanol (20 ml.) was treated with concentrated hydrochloric acid (1.5 ml.) at reflux for 10 mins. The mixture was cooled to room temperature and then poured into saturated aqueous ammonium sulphate solution (130 ml.), and the product extracted into ethyl acetate (2× 50 ml., 1× 20 ml.). The extracts were combined, washed with ammonium sulphate solution (50 ml.) and dried (magnesium sulphate). The solution was concentrated under reduced pressure to low bulk and the residue triturated with petroleum ether (35 ml., B.P. 40/60°). The solid was collected by filtration, washed with petroleum ether (15 ml.) and dried in vacuo at room temperature to give 7 - (p - aminophenylglyoxamido)cephalosporanic acid (500 mg.) as a yellow solid, $[\alpha]_D^{20} +113°$ (c. 0.5, pH 7 buffer); $\lambda_{max.}$ 344, 247 nm.

($E_{1\,cm.}^{1\%}$ 423, 310 respectively). $R_F$ 0.19 (ethyl acetate/n-butanol/pH 5 buffer system).

EXAMPLE 30

7-(3'-amino-4'-chlorophenylglyoxamido)cephalosporanic acid 7-(4'-chloro - 3' - formamidophenylglyoxamido)cephalosporanic acid (1.05 g.) in methanol (15 ml.) (crude acid prepared in Example 28) was treated with hydrochloric acid and the product isolated as described in Example 29 for the corresponding 3-formamido compound to give 7-(3'-amino-4'-chlorophenylglyoxamido)cephalosporanic acid (0.70 g.); $\lambda_{max.}$ 223 nm.

($E_{1\,cm.}^{1\%}$ 912)

$\lambda_{infl.}$ 245 nm.

$C_{18}H_{16}ClN_3O_7S$ requires (percent): Cl, 7.8. Found (percent): Cl, 7.85. $R_F$ 0.38 (ethyl acetate/n/butanol/pH 5 buffer). N.M.R. spectra indicated that the product existed in two isomeric forms.

EXAMPLE 31

Dimethylformamide (8 drops) was added cautiously to a stirred suspension at 0° of thienyl-2-glyoxylic acid (3.12 g., 0.02 mole) in methylene chloride (50 ml.) containing oxalyl chloride (2.54 g., 0.02 mole). After 30 min. at 0°, the suspension was allowed to reach room temperature, at which it was kept for 1 hr. Evaporation left an orange oil, a solution of which in ethyl acetate (10 ml.) was added to a suspension of 7β-aminocephalosporanic acid (2.72 g., 0.01 mole) in refluxing ethyl acetate (125 ml.). The resulting solution was refluxed for 30 min., cooled, and treated with aniline (2.79 g., 0.03 mole). Acidic material (4.20 g.) was retrieved from the washed ethyl acetate solution; a solution in acetone (10 ml.) was treated with 10%-sodium 2-ethylhexanoate in acetone (30 ml.), and kept 1 hr. in the refrigerator. The precipitate (3.59 g.) was impure; a solution of part (3.11 g.) in water (50 ml.) at pH 2 was extracted with ethyl acetate, which removed thienyl-2-glyoxylic acid (these processes were monitored by paper chromatography). The remaining material was converted as before into a crude sodium salt (1.83 g.), part (1.75 g.) of which was stirred for 30 min. with acetone-ether (1:2; 40 ml.) to give sodium 7-(thienyl-2'-glyoxamido) cephalosporanate as a yellow powder (1.50 g.), $[\alpha]_D +107°$ (c. 1.08, water), $\lambda_{max.}$ 265 and 308 nm. ($\epsilon$ 13,500 and 8,800).

$C_{16}H_{13}N_2NaO_7S_2 \cdot 0.5$ $H_2O$ requires (percent): C, 43.6; H, 3.2; N, 6.3; S, 14.5. Found (percent): C, 43.6; H, 3.3; N, 6.1; S, 14.1.

EXAMPLE 32

In a manner similar to that in Example 31, pyrrolyl-2-glyoxalyl chloride (8.7 g., 0.055 mole) and 7β-aminocephalosporanic acid (10.0 g., 0.037 mole) yielded sodium 7 - pyrrolyl-2'-glyoxamido)cephalosporanate (3.2 g.) was colourless prisms from a solution in methanol-ethanol (1:4), $[\alpha]_D +116°$ (c. 1.0, water), $\lambda_{max.}$ 260 and 320 to 321 nm. ($\epsilon$ 12,800 and 12,500).

$C_{16}H_{14}N_3NaO_7S \cdot H_2O$ requires (percent): C, 44.3; H, 3.7; N, 9.7; S, 7.4. Found (percent): C, 44.3; H, 4.0; N, 9.7; S, 7.0.

EXAMPLE 33

In a manner similar to that in Example 31, indolyl-3-glyoxalyl chloride (6.23 g., 0.03 mole) and 7β-aminocephalosporanic acid (5.44 g., 0.02 mole) yielded sodium 7-indolyl - 3' - glyoxamido)cephalosporanate (3.1 g.), from 1:1-acetone-water (70 ml.), $[\alpha]_D +69°$ (c. 0.98; dimethylsulphoxide), $\lambda_{max.}$ 257 and 328 nm. and inflexion at 266.5 nm. ($\epsilon$ 21,200, 11,000, and 20,900).

$C_{20}H_{16}N_3NaO_7S \cdot H_2O$ requires (percent): C, 49.7; H, 3.7; N, 8.6; S, 6.6. Found (percent): C, 50.2; H, 3.7; N, 8.7; S, 6.6.

EXAMPLE 34

(a) α-Methoximinophenylacetic acid

A solution of methoxyammonium chloride (3 g., 0.036 mole) in hot water (18 ml.) was added to a solution of potassium acetate (9.8 g., 0.1 mole) in boiling methanol (30 ml.). The mixture was cooled and kept at 0–5° for 1 hr., and the precipitated potassium chloride was filtered off. The filtrate was added to a solution of phenylglyoxylic acid (5 g., 0.033 mole) in methanol (22 ml.) and the mixture was heated under reflux for 1 hr., cooled, evaporated to half volume and diluted with an equal volume of water. The aqueous solution was extracted with ether to give a white solid (1.99 g.) which was crystallised from benzene-petroleum ether (B.P. 60–80°) (2:1) to give α-methoximinophenylacetic acid (1.05 g., 18%), M.P. 95–96°, $\lambda$ max. (pH 6 phosphate) 256 nm. ($\epsilon$ 11,300), $\nu_{max.}$ (CHBr$_3$) 1750 and 3450, and 1715 and 2600 (carboxylic acid) and 770 cm.$^{-1}$ (—C$_6$H$_5$), n.m.r. (CDCl$_3$) $\tau$ 5.92 (3-proton singlet; OCH$_3$).

$C_9H_9NO_3$ (179.2) requires (percent): C, 60.3; H, 5.1; N, 7.8. Found (percent): C, 60.7; H, 5.05; N, 7.0.

(b) α-Methoximinophenylacetyl chloride

Phosphorus pentachloride (5.21 g., 0.025 mole) was added in portions to a stirred solution of α-methoximinophenylacetic acid (4.51 g., 0.025 mole) in dry benzene (25 ml.). Thionyl chloride (0.3 ml.) was added to ensure complete conversion of the acid and the mixture was heated under reflux for 30 min. The solvent was removed and the residue was distilled under reduced pressure to give the acid chloride (1.3 g., 26%), B.P. 80°/0.1 mm., $\nu_{max.}$ (CHBr$_3$) 1792, 1766 and 1740 cm.$^{-1}$, n.m.r. (CDCl$_3$) $\tau$ 5.84, 5.94 (two ca. 1.5-proton singlets; OCH$_3$) (probably a mixture of syn and anti-forms).

$C_9H_8ClNO_2$ requires (percent): C, 54.6; H, 4.2; Cl, 17.9; N, 7.1. Found (percent): C, 54.6; H, 4.4; Cl, 17.2; N, 7.2.

TABLE III

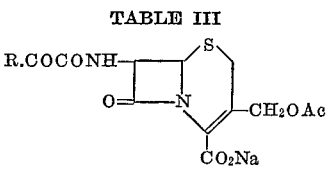

[Glyoxamido compounds prepared substantially according to Example 2(ii)]

| Ex. No. | Compound R= | Percent yield | $[\alpha]_D^{20}$ a | UV absorption $\lambda_{max.}$ nm. | E 1% 1 cm. | $R_F$ b |
|---|---|---|---|---|---|---|
| 3 | 5-chloro-2-methoxyphenyl | 12 | | 260 | 276 | 0.3 |
| 4 | 3-chloro-6-methoxy-2,4-dimethylphenyl | 32 | +118 | 258 | 281 | 0.47 |
| 5 | p-Methoxyphenyl | 47 | +105 | 300 271 | 364 320 | 0.24 |
| 6 | p-Chlorophenyl | 27 | +117 | 267 | 394 | 0.47 |
| 7 | p-Bromophenyl | 57 | +98 | 268 | 356 | 0.28 |
| 8 | 2-methoxy-5-methylphenyl | 21 | +101 | 264 | 372 | 0.23 |
| 9 | 2,5-dimethoxyphenyl | 16 | +101 | 260 | 302 | 0.27 |
| 10 | α-Naphthyl | 46 | +99 | 252 | 363 | 0.5 |
| 11 | m-Iodophenyl | 29 | − | 263 | 310 | 0.38 |
| 12 | 2,5-dichlorophenyl | 37 | +92.2 | 258 | 216 | 0.46 |
| 13 | o-Methoxyphenyl | c 10 | +109 | 263 | 382 | 0.37 |
| 14 | m-Chlorophenyl | 9 | − | 264 | 326 | 0.27 |
| 15 | m-Bromophenyl | 19 | − | 261 | 290 | 0.5 |
| 16 | p-Methylphenyl | 17 | +100 | 268 | 462 | 0.34 |
| 17 | p-Fluorophenyl | 31 | +105 | 263 | 417 | 0.2 |
| 18 | m-Methoxyphenyl | 22 | | 265 | 403 | 0.39 |
| 19 | 2-phenanthryl | 65 | | 267 | 1070 | 0.56 |
| 20 | 4-chloro-3-nitrophenyl | d,e 34 | | 259 | 294 | 0.25 |
| 21 | 2,4-dichlorophenyl | 33 | +109.5 | 264 | 260 | 0.58 |
| 22 | p-Nitrophenyl | c 13 | +146 | 261 | 456 | 0.23 |
| 23 | o-Bromophenyl | 38 | +112 | 262 | 267 | 0.35 |
| 24 | o-Chlorophenyl | 22 | +107 | 262 | 303 | 0.35 |
| 25 | 2,4-dimethoxyphenyl | 22 | +92.5 | 276 | 289 | 0.21 |
| 26 | o-Acetamidophenyl | c 9 | +109 | 260 | 314 | 0.17 |
| 27 | p-Formamidophenyl | 60 | +110 | 306 | 330 | f 0.78 |
| 28 | 4-chloro-3-formamidophenyl | g 34 | − | 241 | 401 | 0.1 | a c. 1.0 in Ph 7 buffer or H$_2$O.
b EtOAc/n-BuOH/pH 5 buffer system.
c Isolated as free acid.
d THF used in place of ether for the preparation of the mixed anydride.
e Product appeared as two isomers.
f 7:3 propanol/water system.
g Reaction product partitioned at pH 3.

(c) Sodium 7β-(2'-methoximinophenylacetamido)
cephalosporanate

7β-aminocephalosporanic acid (2.72 g., 10 mmole) was dissolved in a solution of sodium hydrogen carbonate (2.1 g., 25 mmole) in water (40 ml.), and acetone (30 ml.) was added. This solution was cooled to 0–5°, and 16 ml. of 0.625 M N-methoxy-2-phenyliminoacetyl chloride in acetone were added with stirring over a period of 1 min. The mixture was stirred for 15 min. when a further portion (4 ml.) of the above acid chloride solution was added. After a further 15 min. stirring, the acetone was removed, some precipitated solid filtered off, and the aqueous solution was washed with ethyl acetate 2× 50 ml.), acidified to pH 2 with 2 N-hydrochloric acid and extracted with ethyl acetate (2× 100 and 1× 50 ml.). The combined extract was washed with water (50 ml.), dried and evaporated to a pale yellow froth (3.22 g.). This froth was dissolved in acetone and a 10% solution of sodium 2-ethylhexanoate in acetone was added. The precipitated sodium salt (2.59 g.) was purified by solution in the minimum volume of methanol and precipitation with isopropanol to give sodium 7β-(2'-methoximinophenylacetamido)cephalosporanate (1.35 g., 30%), $[\alpha]_D + 66°$ (c. 1.04; $H_2O$), $\lambda_{max}$. (pH 6 phosphate) 257 n.m. (ε 17,350) $\nu_{max}$. (Nujol) 1762 (β-lactam), 1740 and 1245, (—OAc), 1670 and 1530 (—CONH) and 1610 cm.$^{-1}$ (—$CO_2^-$), n.m.r. ($D_2O$) τ 5.98, 6.00 (2 ca. 1.5-proton singlets; $OCH_3$), (probably a mixture of syn- and anti-forms), $R_f$ 0.48 (ethyl acetate/n-butanol/pH 5 buffer system at 37°).

The biological activities of the compounds described in the above examples are given in the following table. Strain 663 is penicillin sensitive while Strains 604 and 3452 are penicillin resistant.

TABLE IV

| Compound of Example No. | Tube dilution assay (γ/ml.) Staph. aureus | | | Urinary recovery percent oral administered to female rats | Mouse protection $ED_{50}$/mg./kg. dose S. aureus, Strain 663 subcutaneous |
|---|---|---|---|---|---|
| | Strain 663 | Strain 604 | Strain 3452 | | |
| 1 | 0.6 | >2.5 | 4.0 | 1.3 | Ca. 50 |
| 2 | 0.6 | 1.25 | 4 | 2.45 | Ca. 50 |
| 3 | 1.25 | 2.5 | 4.0 | 1.85 | 40 |
| 4 | 2.5 | 2.5 | 8 | <2 | >50 |
| 5 | 0.31 | 1.25 | 2.0 | 1.1 | Ca. 50 |
| 6 | 0.08 | 1.25 | <0.5 | 5.0 | 9 |
| 7 | 0.31 | 1.25 | 16 | 4.0 | 30 |
| 8 | 0.62 | 2.5 | 8.0 | 1.0 | >50 |
| 9 | >2.5 | >2.5 | 16.0 | <2 | >59 |
| 10 | 0.15 | 0.3 | <0.5 | 1.0 | 12 |
| 11 | 0.16 | 1.25 | <0.5 | 3.2 | <60 |
| 12 | 0.62 | 1.25 | 4.0 | 5.6 | >50 |
| 13 | 2.5 | 2.5 | 8 | 1.1 | Ca. 50 |
| 14 | 0.31 | 1.25 | 4.0 | 2.5 | 12.0 |
| 15 | 0.16 | 0.13 | <0.5 | 1.4 | Ca. 50 |
| 16 | 0.16 | 0.62 | <0.5 | 1.65 | 6 |
| 17 | 0.31 | 1.25 | 8.0 | 1.7 | Ca. 50 |
| 18 | 0.02 | 0.6 | <0.5 | 1.5 | 9 |
| 19 | 1.25 | >2.5 | 31 | 0.5 | 20 |
| 20 | 1.25 | 1.25 | 8 | 0.9 | Ca. 50 |
| 21 | 1.25 | 2.5 | 8.0 | 4.7 | 25 |
| 22 | 1.25 | 2.5 | 8 | 2.2 | Ca. 20 |
| 23 | 1.25 | 1.25 | 4 | 1.9 | Ca. 50 |
| 24 | 0.6 | 1.25 | 2.0 | 7.1 | 40 |
| 25 | >2.5 | >2.5 | 8.0 | 13.0 | Ca. 50 |
| 26 | 2.5 | >2.5 | 8.0 | 2.3 | >50 |
| 27 | 1.25 | 2.5 | 8.0 | 4.9 | 18 |
| 28 | 0.62 | 1.25 | 4.0 | 0.85 | 18 |
| 29 | 0.16 | 0.31 | 2.0 | <2.3 | <12 |
| 30 | 1.25 | 1.25 | 4.0 | 0.99 | Ca. 6 |
| 31 | 0.62 | 1.25 | 4.0 | 0.37 | Ca. 50 |
| 32 | 2.5 | >2.5 | 8.0 | <1 | >50 |
| 33 | 1.25 | 1.25 | 1.0 | 2.18 | >50 |
| 34 | 1.25 | 1.25 | 2.0 | Ca. 3 | 40 |

The formulation of pharmaceutical preparations is illustrated in the following examples.

EXAMPLE A

Ointment: Percent w./w.
(1) Sodium 7 - (p - chlorophenylglyoxamido) cephalosporanate _____ 5
(2) Cetomacrogol 1000 [1] B.P.C. _____ 6
(3) Cetostearyl alcohol _____ 24
(4) Liquid paraffin _____ 10
(5) Soft paraffin to make up to 100 parts.

[1] Cetomacrogol 1000—A macrogol ether containing 20–24 oxyethylene groups in the polyoxyethylene chain.

2, 3, 4 and 5 were melted together and stirred to give a homogeneous base. The particle size of the active ingredient was reduced to about 10 microns or less and dispersed in the melted base at 40° C. The resulting ointment was refined by passage through an ointment mill.

EXAMPLE B

Injection

Sterile sodium 7-(p-chlorophenylglyoxamido) cephalosporanate was distributed aseptically into vials, each containing 250 mg. and sealed to exclude moisture and bacteria. The material was dissolved before use by the addition of sterile water to produce a 2 ml. injection.

EXAMPLE C

Intramammary preparation: Percent w./w.
Sodium 7-(p - chlorophenylglyoxamido) cephalosporanate _____ 10
White beeswax _____ 2
Arachis oil to make up to 100 parts.

The beeswax was dissolved in arachis oil and the sterilized mixture heated at 150° C. for 1 hour. The mixture was then cooled rapidly, with stirring, to room temperature and stored in a refrigerator overnight. The base was then subjected to slow planetary stirring and the active material was incorporated as a sterile microfine powder, giving a homogeneous mix of soft consistency. The preparation was aseptically distributed into sterilized intramammary tubes so that 3 grams of the product might be extruded from each tube.

EXAMPLE D

Oral Tablet: Mgm.
(1) Sodium 7 - (p - chlorophenylglyoxamido) cephalosporanate (very fine powder) _____ 250
(2) Mannitol _____ 200
(3) Potato starch _____ 47
(4) Magnesium stearate _____ 3

1 and 2 were blended together and granulated with 3 as a 10% starch paste. The granules were passed through a No. 60 mesh (B.S.) screen, dried to constant weight, and sieved through a No. 16 mesh (B.S.) screen. The granules were then lubricated by blending in 4, and compressed on 7/16" punches at 500 mgm. per tablet.

The tablets may be coated if required, for instance with a readily soluble conventional film coating.

We claim:

1 A compound selected from the group consisting of a compound of the formula

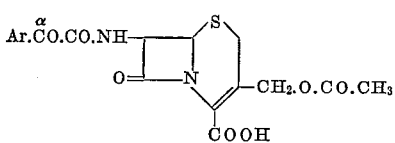

in which Ar is a member selected from the group consisting of

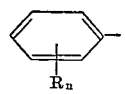

where R is selected from the group consisting of amino, formamido, lower alkanoylamido mono-lower alkylamino, di-lower alkylamino, halo, lower alkyl, lower alkoxy, lower alkoxycarbonyl, nitro and cyano, and n is an integer from 1 to 4, naphthyl and phenanthryl; pharmaceutically acceptable salts and α-carbonyl derivatives thereof, said derivatives being selected from the group consisting of the oxime, semicarbazone, thiosemicarbazone, isonicotinoylhydrazone, hydrazone and methoxime.

2. A compound as defined in claim 1 which is 7-(p-chlorophenylglyoxamido) cephalosporanic acid.

3. A compound as defined in claim 1 which is 7-(p-bromophenylglyoxamindo) cephalosporanic acid.

4. A compound as defined in claim 1 which is 7-(α-naphthylglyoxamido) cephalosporanic acid.

5. A compound as defined in claim 1 which is 7-(m-iodophenylglyoxamido) cephalosporanic acid.

6. A compound as defined in claim 1 which is 7-(2',5'-dichlorophenylglyoxamido) cephalosporanic acid.

7. A compound as defined in claim 1 which is 7-(m-chlorophenylglyoxamido) cephalosporanic acid.

8. A compound as defined in claim 1 which is 7-(2',4'-dichlorophenylglyoxamido) cephalosporanic acid.

9. A compound as defined in claim 1 which is 7-(o-chlorophenylglyoxamido) cephalosporanic acid.

10. A compound as defined in claim 1 which is 7-(2',4'-dimethoxyphenylglyoxamido) cephalosporanic acid.

11. A compound as defined in claim 1 which is 7-(p-formamidophenylglyoxamido) cephalosporanic acid.

References Cited
UNITED STATES PATENTS

| | | | |
|---|---|---|---|
| 3,422,099 | 1/1969 | Crast | 260—243C |
| 3,338,896 | 8/1967 | Takano et al. | 260—243C |

NICHOLAS S. RIZZO, Primary Examiner

U.S. Cl. X.R.

424—246